(No Model.)
A. KAYSER.
PROCESS OF MAKING ALKALINE SILICATES.
No. 376,410. Patented Jan. 10, 1888.
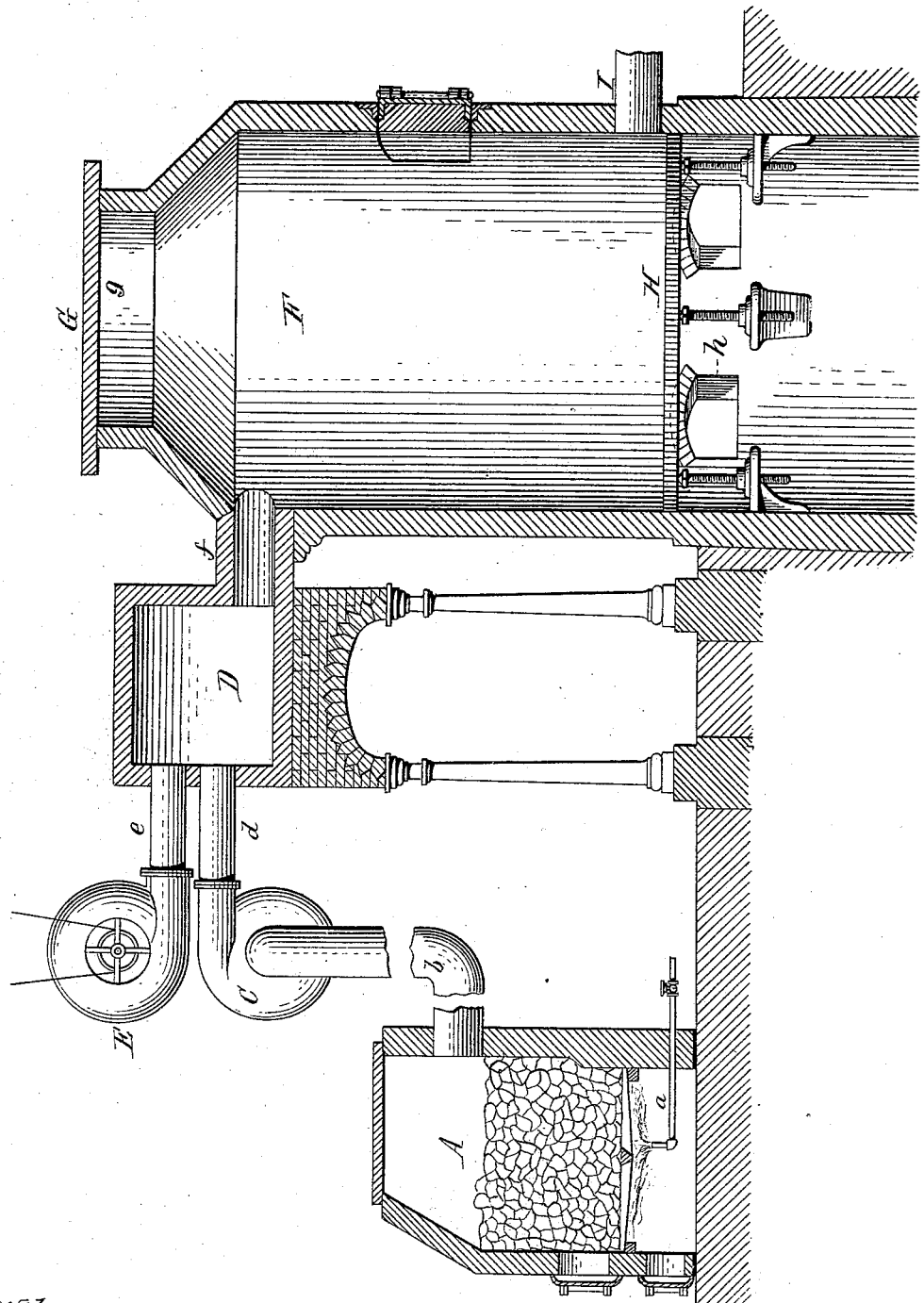
Witnesses:
Geo. J. Buchheit Jr.
Chas. J. Buchheit
A. Kayser  Inventor.
By Wilhelm Bonner
Attorneys.

UNITED STATES PATENT OFFICE.

ADOLF KAYSER, OF BUFFALO, NEW YORK, ASSIGNOR OF TWO-THIRDS TO HORACE WILLIAMS AND ALBERT B. YOUNG, BOTH OF SAME PLACE.

PROCESS OF MAKING ALKALINE SILICATES.

SPECIFICATION forming part of Letters Patent No. 376,410, dated January 10, 1888.

Application filed August 3, 1887. Serial No. 216,006. (No specimens.)

*To all whom it may concern:*

Be it known that I, ADOLF KAYSER, a citizen of the United States, residing at Buffalo, in the county of Erie and State of New York, have invented new and useful Improvements in the Process of Manufacturing the Silicate of Sodium and Potassium, of which the following is a specification.

This invention relates to a pneumatic process of manufacturing the silicate of sodium and potassium, and has for its object to produce these substances in a simple and economical manner.

It is well known that silica and sodium chloride heated to red heat in a current of steam produce muriatic-acid gas and sodium oxide, which latter combines with the silicic acid, forming sodium silicate. When this conversion is carried on in an externally-heated tube or vessel through which a current of steam is passed, as heretofore proposed, only a limited amount of sodium chloride is converted. This is principally due to the insufficiency of temperature in the inner portions of the mass, which latter does not become sufficiently heated to excite the acid properties of the silica in all of its parts to the point at which the silica decomposes the sodium chloride, which reaction, as is well known, takes place only at a high temperature. My improvement is designed to obviate this difficulty and to effect a thorough and practically complete conversion of the sodium chloride into its silicate.

In practicing my invention I mix finely-divided silica with common salt (sodium chloride) and sufficient water to render the mixture plastic. The quantity of sodium chloride should be so calculated that the resulting sodium silicate does not contain more than about fifteen per cent. of sodium oxide. If sodium chloride is used in excess of this proportion, such excess will be evaporated and escape with the muriatic acid and the waste gases. When the silica absorbs sodium oxide in excess of about fifteen per cent., the substance becomes soft and the outer portions of the cakes become glassy, whereby the porosity of the cakes is destroyed and the further action of the gases upon the interior portions of the cakes rendered impossible. The silica should be employed in a finely-divided condition in order to give the best results. Infusorial earth answers the purpose very well. If coarse sand is used, the interstices between the grains allow the escape of a large proportion of the evaporated sodium chloride. This can be avoided, in a measure, by mixing a sufficient quantity of fine sand with the coarse sand to fill the interstices between the coarse particles. I have found it very advantageous to mold the cakes under pressure, whereby the solidity of the cakes is considerably increased and the evaporation of the chloride correspondingly prevented. The granular condition and the quality of the sodium chloride do not materially affect the process. Coarse salt, such as is produced by evaporating brine or crushed rock-salt, is practically as effective as finely-ground salt. This mixture of silica and sodium chloride is molded into cakes, balls, or bricks of convenient size and dried. Cakes having the dimensions of three by two by one and one-half inches will answer the purpose very well. The dry cakes are then placed into a converter constructed of fire-brick in order to withstand the high degree of heat which is required for the conversion. This converter is heated by highly-heated gases which pass through the converter and come in direct contact with the cakes placed in the same. I prefer to employ generator-gases and admit below the grate of the generator as much steam as can be used without impairing the operation of the generator. This generator being charged with coal produces carbon monoxide and hydrogen, which gases pass from the generator to a combustion-chamber located near the gas-inlet opening of the converter. In this combustion-chamber the gases are burned by a forced air-blast, forming carbon dioxide and steam under development of a high degree of heat. In order to avoid any reducing action by carbon monoxide, a slight excess of air is admitted to the combustion-chamber. These hot gases pass through the converter and come in intimate contact with the cakes contained therein and penetrate the latter thoroughly, carrying the heat and steam into the innermost portions of the cakes and heating the latter to a bright-red heat. The active substance contained in this current of gases is the steam, and these gases act not only as the heating agent in the converter, but facilitate, by diffusion, the formation of muriatic acid, acting even more energetically than superheated steam alone. The muriatic-acid gas which is generated during the process of conversion can be condensed or collected in any suitable manner. These generator-gases may contain sulphurous products from the coal used in the generator, which products, being transformed into sulphurous acid, will at a low temperature produce sodium sulphate. This salt is decomposed at a higher temperature and converted into silicate, the sulphurous acid being driven off. When the conversion is complete, which usually occurs in from eighteen to twenty-four hours after the working temperature has been reached, the silicate, containing about eighty-five per cent. of silica and fifteen per cent. of sodium oxide, is removed from the converter and crushed in a suitable reducing-machine. This silicate is an excellent material for the manufacture of glass, in which manufacture it takes the place of a part of the soda and sand ordinarily employed. By its use in the manufacture of glass the time required for fusing the material is greatly reduced. Upon smelting this silicate, together with a suitable quantity of soda, on a hearth, water-glass is produced.

Potassium chloride is substituted for the sodium chloride when it is desired to produce potassium silicate.

The accompanying drawing is a sectional elevation of an apparatus which may be employed in practicing my invention.

A represents the gas-generator, which may be of any suitable construction, and which is charged with coal, coke, or other suitable fuel.

$a$ represents the pipe by which steam is supplied to the generator.

$b$ represents the pipe by which the gas escapes from the generator.

C represents a fan-blower or other apparatus connected with the gas-pipe $b$.

$d$ represents the discharge-pipe of the fan C, and D represents the combustion-chamber, into which the gas is delivered by the pipe $d$.

$e$ represents a pipe by which a blast of air is delivered from a fan-blower, E, or other suitable apparatus, into the combustion-chamber D for burning the gas in the same.

F represents the converter, connected near its top with the combustion-chamber D by a pipe, $f$, through which the hot gases pass from the combustion-chamber to the converter. The latter is provided in its top with a feed-opening, $g$, having a removable cover, G, and in its bottom with a discharge-opening, $h$, provided with a removable bottom, H. The discharge-opening $h$ should be of the same diameter as the converter, in order to permit the free discharge of the converted cakes, which are liable to cake together.

I represents a pipe which connects with the lower portion of the converter, and through which the waste gases escape from the same and pass to the condenser in which the muriatic-acid gas is condensed.

When two or more converters are used in a battery, the gas-exit pipe I of one converter is connected with the gas-inlet of the next following converter.

While I recommend the employment of this apparatus, I do not wish to confine myself to the same, as it may be modified without departing from my invention.

I am aware that it has been proposed to produce sodium silicate by evaporating sodium chloride by generator-gases, and conducting this vapor, together with said gases, through a charge of silica, and I do not claim this method, as it is essentially different from the method herein described.

I claim as my invention—

The herein-described method of producing the silicate of sodium or potassium from the chlorides thereof, which consists in mixing the chloride with silica, molding the mixture into cakes or bricks, and heating the same in a converter by means of highly-heated gases containing steam passed through the converter, substantially as set forth.

Witness my hand this 26th day of July, 1887.

A. KAYSER.

Witnesses:
 JNO. J. BONNER,
 GEO. J. BUCHHEIT, Jr.